US012674435B2

(12) United States Patent
Sakurai et al.

(10) Patent No.: US 12,674,435 B2
(45) Date of Patent: Jul. 7, 2026

(54) KNOCKING CONTROL METHOD FOR INTERNAL COMBUSTION ENGINE AND KNOCKING CONTROL DEVICE

(71) Applicant: NISSAN MOTOR CO., LTD., Yokohama (JP)

(72) Inventors: Yuusuke Sakurai, Kanagawa (JP); Kazuki Tanzawa, Kanagawa (JP); Yoshikatsu Matsuda, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/960,129

(22) Filed: Nov. 26, 2024

(65) Prior Publication Data

US 2025/0172116 A1 May 29, 2025

(30) Foreign Application Priority Data

Nov. 28, 2023 (JP) ................................ 2023-200393

(51) Int. Cl.
*F02P 5/152* (2006.01)

(52) U.S. Cl.
CPC .................................. *F02P 5/1523* (2013.01)

(58) Field of Classification Search
CPC .................................................... F02P 5/1523
See application file for complete search history.

(56) References Cited

U.S. PATENT DOCUMENTS

2003/0230281 A1* 12/2003 Hoshino ............... G01L 23/225
123/406.29
2012/0255531 A1* 10/2012 Kinose ................ F02D 41/0085
123/673
2020/0291914 A1 9/2020 Shimada et al.
2021/0310456 A1 10/2021 Hitomi et al.

FOREIGN PATENT DOCUMENTS

EP 0420445 A2 * 4/1991 ............ F02P 5/1455
EP 3 677 762 A1 7/2020
JP 2004011569 A * 1/2004

* cited by examiner

*Primary Examiner* — Kevin A Lathers
(74) *Attorney, Agent, or Firm* — Foley & Lardner LLP

(57) ABSTRACT

A method of controlling knocking of an internal combustion engine has, when knocking having a knock judgment threshold value or more is detected, retard-correcting an ignition timing at a predetermined retardation speed, while the knocking is not detected, gradually advancing the ignition timing at a predetermined advance speed so as to approach an MBT point, performing an ignition timing correction for aiming for a first trace-knock state, and when an accelerator opening is a full-open-equivalent opening or more and also for a delay period until a predetermined catalyst protection increasing control is started, performing an ignition timing correction for aiming for a second trace-knock state in which the ignition timing is controlled to a relatively advance side as compared with that in the first trace-knock state.

7 Claims, 3 Drawing Sheets

KNOCKING CONTROL METHOD FOR INTERNAL COMBUSTION ENGINE AND KNOCKING CONTROL DEVICE

BACKGROUND OF THE INVENTION

The present invention relates to a knocking control method that suppresses knocking of an internal combustion engine by ignition timing feedback control and a knocking control device.

As a technique of suppressing knocking of an internal combustion engine, there is widely known a technique of maintaining knocking at a trace-knock state by detecting knocking by a knocking sensor (or an in-cylinder pressure sensor), retard-correcting an ignition timing by a predetermined amount when detecting knocking having a certain level and gradually advancing the ignition timing if the knocking is not detected afterwards.

Japanese Unexamined Patent Application Publication No. 2004-011569 (hereinafter is referred to as "JP2004-011569") discloses a technique of setting a knock judgment level to be high when a vehicle speed is high and allowing stronger knocking than that when the vehicle speed is low. This is based on an idea that since an interior noise level is originally high during high speed travel, a vehicle occupant (s) is less apt to feel unpleasantness caused by noise generated by the knocking.

SUMMARY OF THE INVENTION

It can be said that when a driver fully opens an accelerator opening (a driver fully depresses an accelerator pedal), the driver requires an immediate acceleration of a vehicle. However, in such a case, since the ignition timing is retard-corrected based on the detection of the knocking so as to be brought into the trace-knock state, acceleration performance is impaired.

JP2004-011569 cannot solve this problem occurring upon full-open acceleration.

An object of the present invention is to provide a method of controlling knocking of an internal combustion engine and a knocking control device of the internal combustion engine which are capable of solving the above problem.

According to one aspect of the present invention, a method of controlling knocking of an internal combustion engine, the method comprises: when knocking having a knock judgment threshold value or more is detected, retard-correcting an ignition timing at a predetermined retardation speed; while the knocking is not detected, gradually advancing the ignition timing at a predetermined advance speed so as to approach a Maximum Brake Torque (MBT) point; performing an ignition timing correction for aiming for a first trace-knock state; and when an accelerator opening is a full-open-equivalent opening or more and also for a delay period until a predetermined catalyst protection increasing control is started, performing an ignition timing correction for aiming for a second trace-knock state in which the ignition timing is controlled to a relatively advance side as compared with that in the first trace-knock state.

According to another aspect of the present invention, a knocking control device of an internal combustion engine comprises: a knocking detection sensor provided at the internal combustion engine; a knocking judgment unit configured to perform knocking judgment by comparing a signal of the knocking detection sensor with a knock judgment threshold value; and an ignition timing correction unit configured to, when knocking having the knock judgment threshold value or more is detected by the knocking judgment unit, retard-correct an ignition timing at a predetermined retardation speed, and while the knocking is not detected, gradually advance the ignition timing at a predetermined advance speed so as to approach an MBT point, wherein the ignition timing correction unit is configured to perform an ignition timing correction for aiming for a first trace-knock state, and when an accelerator opening is a full-open-equivalent opening or more and also for a delay period until a predetermined catalyst protection increasing control is started, perform an ignition timing correction for aiming for a second trace-knock state in which the ignition timing is controlled to a relatively advance side as compared with that in the first trace-knock state.

That is, when the accelerator opening becomes, for instance, fully open, in order to protect a catalyst provided in an exhaust system, after an appropriate delay time, a fuel injection amount is increased (in other words, an air fuel ratio is made rich). In the present invention, when the accelerator opening is the predetermined full-open-equivalent opening or more and also for the above delay period, the ignition timing correction is performed for aiming for the second trace-knock state in which a knocking level is relatively high. Therefore, an ignition timing retardation amount becomes relatively small.

According to the present invention, when the accelerator opening is the full-open-equivalent opening or more and also for the delay period until the predetermined catalyst protection increasing control is started, reduction in torque of the internal combustion engine becomes small, thereby obtaining high acceleration performance along driver's intention.

The other objects and features of the present invention will become understood from the following description with reference to the accompanying drawings.

DETAILED DESCRIPTION OF THE INVENTION

An embodiment of the present invention will be described below with reference to the drawings.

Figure 1:
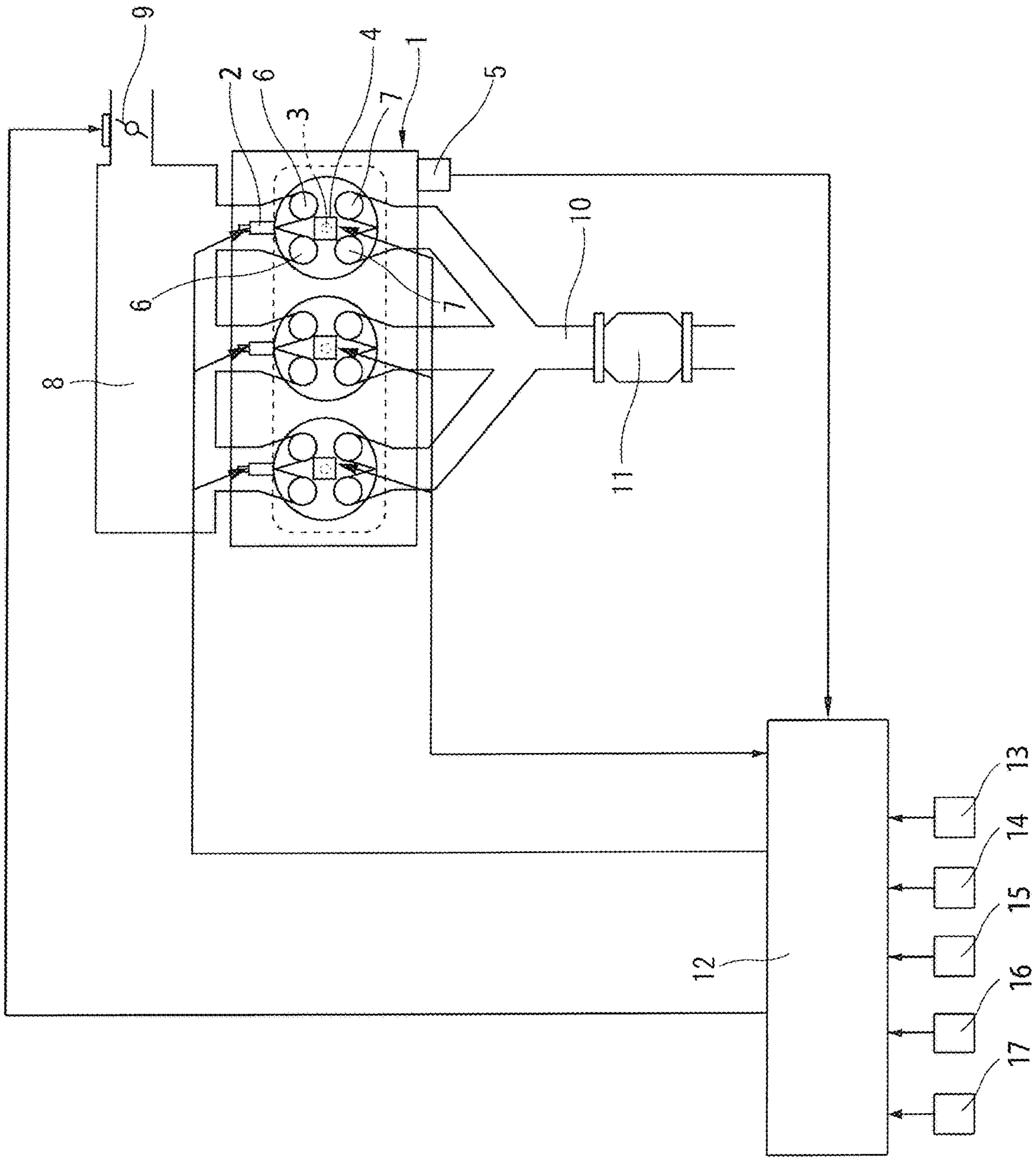
FIG. 1 is an explanatory drawing showing a system configuration of an internal combustion engine according to an embodiment of the present invention.

FIG. 1 illustrates a system configuration of an internal combustion engine 1 for a vehicle to which the present invention is applied. This internal combustion engine 1 in the present embodiment is, for instance, an inline three-cylinder direct fuel injection spark-ignition internal combustion engine. The internal combustion engine 1 has, for each cylinder, a fuel injection valve 2 injecting fuel toward an inside of the cylinder and an ignition plug (a spark plug) 3 for igniting produced mixture (air-fuel mixture), for instance, at a middle portion on a ceiling surface. This ignition plug 3 is connected to an ignition unit 4 provided for each cylinder, and an ignition timing for each cylinder can be controlled by a control signal from an engine controller 12.

A knocking sensor 5, which detects knocking based on mechanical vibration generated when knocking occurs at any of the cylinders, is arranged at an appropriate position of a cylinder block of the internal combustion engine 1.

Intake ports, each of which is opened/closed by an intake valve 6 for each cylinder, gather at an intake collector 8. An electronic control throttle valve 9 whose opening is controlled by a control signal from the engine controller 12 is arranged at an inlet portion of this intake collector 8. Exhaust ports, each of which is opened/closed by an exhaust valve 7 for each cylinder, are connected to an exhaust manifold 10. A catalyst device 11 for cleaning engine emissions is provided at an outlet side of the exhaust manifold 10.

The engine controller 12 inputs, as operating conditions of the internal combustion engine 1, detection signals of sensors such as a crank angle sensor 13 for detecting an engine rotation speed, an air flow meter 14 for detecting an intake air quantity that corresponds to a load, a water temperature sensor 15 for detecting temperature of cooling water, an accelerator opening sensor 16 for detecting a depression amount of an accelerator pedal operated by a driver, and an air-fuel ratio sensor 17 for detecting an exhaust air fuel ratio. The engine controller 12 optimally controls, based on these detection signals, a fuel injection quantity and an injection timing by the fuel injection valve 2, an ignition timing of the ignition plug 3 through the ignition unit 4, an opening of the throttle valve 9, etc.

It is noted that the fuel injection quantity is basically feedback-controlled so that the exhaust air fuel ratio detected by the air-fuel ratio sensor 17 becomes equivalent to a theoretical air fuel ratio. Further, a catalyst protection increasing region (or a catalyst protection strengthening region) is set in an operating region at a high load side that is close to a full load. Then, when an operating condition determined by the load and the rotation speed is within this catalyst protection increasing region, after an appropriate delay time, based on a catalyst temperature etc., a fuel amount is increased so that the air fuel ratio becomes rich, i.e. catalyst protection increase is executed (catalyst protection is strengthened). By the air fuel ratio becoming rich, an exhaust temperature decreases, then deterioration of the catalyst due to an excessively high temperature is avoided.

Figure 2:
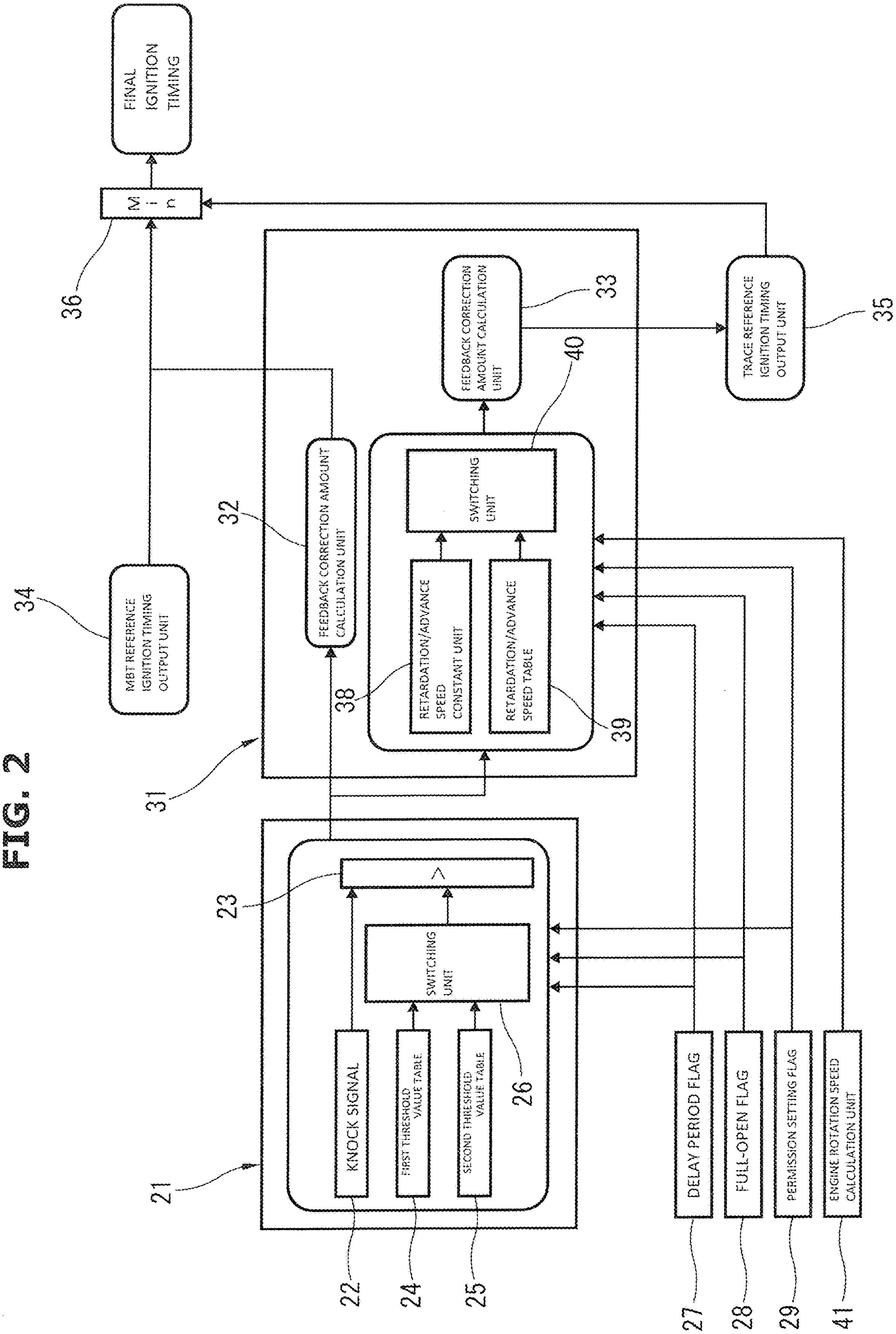
FIG. 2 is a functional block diagram of knocking control according to the embodiment.

Next, knocking control executed by the engine controller 12 will be described. FIG. 2 is a functional block diagram of the knocking control according to the embodiment. A knocking judgment unit 21 extracts a knock signal 22 for each cylinder from a detection signal of the knocking sensor 5, and performs detection of the knocking for each cylinder by comparing this signal with a knock judgment threshold value in a comparison unit 23. For instance, the knocking judgment unit 21 extracts a signal that is within a predetermined crank angle range for each cylinder from an output signal of the knocking sensor 5, and judges whether a knocking vibration element having the knock judgment threshold value or more is contained in this extracted signal. If the knocking vibration element having the knock judgment threshold value or more is present, it is judged that the knocking has occurred.

The knock judgment threshold values are previously stored with the engine rotation speed being a parameter in a first threshold value table 24 and a second threshold value table 25, and a value in either one of the tables selected by a switching unit 26 is output to the comparison unit 23.

The first threshold value table 24 stores normal knock judgment threshold values. With these normal knock judgment threshold values stored in the first threshold value table 24, an intensity of the knocking (or a strength of the knocking) in a normal trace-knock state (this is referred to as a first trace-knock state) is substantially determined.

The second threshold value table 25 has knock judgment threshold values each having a relatively higher level than the values of the first threshold value table 24. That is, in order for knocking vibration having a relatively high intensity to be allowed, each knock judgment threshold value for the same engine rotation speed is set to be relatively high. With these knock judgment threshold values stored in the second threshold value table 25, an intensity of the knocking (or a strength of the knocking) in a trace-knock state when the accelerator opening is a full-open-equivalent opening or more and also for a delay period until the aforementioned catalyst protection increasing control is started (a delay period up to start of the aforementioned catalyst protection increasing control) (this is referred to as a second trace-knock state) is substantially determined.

The switching unit 26 inputs a delay period flag 27 indicating that a current time is in the delay period until the catalyst protection increasing control is started (the delay period up to start of the catalyst protection increasing control), a full-open flag 28 indicating that the accelerator opening is the full-open-equivalent opening or more, and a permission setting flag 29 indicating the pros and cons of the control as the second trace-knock state. The switching unit 26 selects the second threshold value table 25 when these three signals are all “ON”, whereas selects the first threshold value table 24 when at least one of these three signals is “OFF”. Here, the permission setting flag 29 is a switch operated by software, and can be set to “OFF” by an initial setting etc. by a user.

Therefore, in the knocking judgment unit 21, only when the accelerator opening is the full-open-equivalent opening or more and also a current time is in the delay period until the catalyst protection increasing control is started (the delay period up to start of the catalyst protection increasing control), the knocking judgment is performed using the relatively high knock judgment threshold value by the second threshold value table 25. In the other cases, the knocking judgment is performed using the normal knock judgment threshold value by the first threshold value table 24. Because of this, if similar knocking vibration is output from the knocking sensor 5, the former judgment (i.e. the knocking judgment using the relatively high knock judgment threshold value by the second threshold value table 25) is lower in probability of judging that the knocking has occurred. That is, in the case of the former judgment, an ignition timing retardation correction by or according to detection of the knocking does not easily occur.

It is noted that the above “full-open-equivalent opening” means an accelerator opening that is the extent regarded as full open, although which is not full open in the strict sense, and the “full-open-equivalent opening” is previously set, for instance, for each engine rotation speed. Further, in the case of the accelerator opening that is the full-open-equivalent opening or more, normally, the operating condition (the load and the engine rotation speed) of the internal combustion engine 1 is included in the aforementioned catalyst protection increasing region. Furthermore, in order to avoid hunting of the control, the “full-open-equivalent opening” is provided with appropriate hysteresis. Therefore, strictly speaking, the “full-open-equivalent opening” includes a first full-open-equivalent opening that is used for an opening increasing direction and a second full-open-equivalent opening that is a relatively small opening used for an opening decreasing direction. However, in the following description, the "full-open-equivalent opening" will be described without particularly differentiating both these first and An ignition timing correction unit 31 retard-corrects an ignition timing at a predetermined retardation speed when the knocking judgment unit 21 detects knocking, whereas gradually advances an ignition timing at a predetermined advance speed so as to approach a Maximum Brake Torque (MBT) point while knocking is not detected. The ignition timing correction unit 31 in the embodiment has a feedback correction amount calculation unit 32 for an MBT control region and a feedback correction amount calculation unit 33 for a trace control region. That is, an operating region determined by the load and the rotation speed of the internal combustion engine 1 is broadly divided into the trace control region where the knocking tends to occur and the MBT control region where the knocking does not easily occur, then feedback control of the ignition timing proper to each region is performed. A region close to the full-open-equivalent opening, targeted in the present invention, is included in the trace control region.

In the MBT control region, the MBT feedback correction amount calculation unit 32 for the MBT control region calculates an MBT feedback correction amount for each cylinder based on the detection of the knocking. More specifically, the MBT feedback correction amount calculation unit 32 calculates the MBT feedback correction amount so that when it is judged that knocking has occurred in a certain cylinder, the MBT feedback correction amount relatively greatly increases, and when knocking is not detected, the MBT feedback correction amount decreases by predetermined very small amounts. That is, in this example, increase in the feedback correction amount corresponds to a change of the ignition timing to a retardation side. The MBT feedback correction amount is maintained as it is without being updated while the operating condition is in the trace control region. In the MBT control region, by subtracting the above MBT feedback correction amount from an MBT reference ignition timing output by an MBT reference ignition timing output unit 34, a corrected ignition timing (an after-correction ignition timing) for the MBT control region is determined.

Likewise, in the trace control region, the trace feedback correction amount calculation unit 33 for the trace control region calculates a trace feedback correction amount for each cylinder based on the detection of the knocking. More specifically, the trace feedback correction amount calculation unit 33 calculates the trace feedback correction amount so that when it is judged that knocking has occurred in a certain cylinder, the trace feedback correction amount relatively greatly increases, and when knocking is not detected, the trace feedback correction amount decreases by predetermined very small amounts. The trace feedback correction amount is maintained as it is without being updated while the operating condition is in the MBT control region. In the trace control region, by subtracting the above trace feedback correction amount from a trace reference ignition timing output by a trace reference ignition timing output unit 35, a corrected ignition timing (an after-correction ignition timing) for the trace control region is determined.

Finally, the corrected ignition timing for the MBT control region and the corrected ignition timing for the trace control region are compared in a comparison unit 36, and a relatively retardation-side corrected ignition timing (a corrected ignition timing whose amount of angle of advance is smaller) is output as an ignition timing of the target cylinder.

As described above, in this embodiment, the ignition timing correction based on the detection of the knocking and the final ignition timing setting are performed by the cylinders (i.e. for each cylinder). However, in the present invention, such ignition timing control for each cylinder is not essential. That is, the present invention can also be applied to a method of feedback-controlling ignition timings of all cylinders at once.

As an increase speed of the trace feedback correction amount (i.e. an ignition timing retardation speed) when detecting the knocking and a decrease speed of the trace feedback correction amount (i.e. an ignition timing advance speed) when not detecting the knocking by the trace feedback correction amount calculation unit 33, either a value (a retardation speed and an advance speed) set as a constant in a retardation/advance speed constant unit 38 or a value (a retardation speed and an advance speed) read out from a retardation/advance speed table 39 is used. That is, either one of the retardation/advance speed constant unit 38 or the retardation/advance speed table 39 is selected by a switching unit 40, and selected retardation speed and advance speed are given to the trace feedback correction amount calculation unit 33.

The switching unit 40 inputs the delay period flag 27 indicating that a current time is in the delay period until the catalyst protection increasing control is started (the delay period up to start of the catalyst protection increasing control), the full-open flag 28 indicating that the accelerator opening is the full-open-equivalent opening or more, and the permission setting flag 29 indicating the pros and cons of the control as the second trace-knock state. The switching unit 40 selects the retardation/advance speed table 39 when these three signals are all "ON", whereas selects the retardation/advance speed constant unit 38 when at least one of these three signals is "OFF".

The retardation/advance speed constant unit 38 has, as the constants, the ignition timing retardation speed when detecting the knocking and the ignition timing advance speed when not detecting the knocking.

The retardation/advance speed table 39 stores values of the increase speed of the trace feedback correction amount, which corresponds to the retardation speed, when detecting the knocking and values of the decrease speed of the trace feedback correction amount, which corresponds to the advance speed, when not detecting the knocking, with the engine rotation speed being a parameter. Since each value of the increase speed and the decrease speed is given to the retardation/advance speed table 39 as a speed that meets real time, by reading a corresponding value with the engine rotation speed output by an engine rotation speed calculation unit 41 being a parameter, this value substantially becomes a speed corresponding to a crank angle.

The retardation speed when detecting the knocking in the retardation/advance speed table 39 is relatively low as compared with the retardation speed of the retardation/advance speed constant unit 38. Further, the advance speed when not detecting the knocking in the retardation/advance speed table 39 is relatively high as compared with the advance speed of the retardation/advance speed constant unit 38. Therefore, if the knocking is detected with same frequency, according to the retardation speed/advance speed of the retardation/advance speed table 39, the final ignition timing is maintained at a relatively advance side as compared with the control by the retardation speed/advance speed of the retardation/advance speed constant unit 38.

As described above, in the present embodiment, when the accelerator opening is the full-open-equivalent opening or more and also for the delay period until the predetermined catalyst protection increasing control is started (the delay period up to start of the catalyst protection increasing control), as compared with a normal period that does not satisfy these conditions, the knock judgment threshold value is set to be relatively high, and the ignition timing retardation speed when detecting the knocking becomes relatively low, also the ignition timing advance speed when not detecting the knocking becomes relatively high. With these setting, an ignition timing in the trace-knock state, which can be obtained by the ignition timing feedback control, is at relatively advance side. In other words, an ignition timing retardation amount in the trace-knock state from the MBT point becomes small, then torque reduction becomes small.

Figure 3:
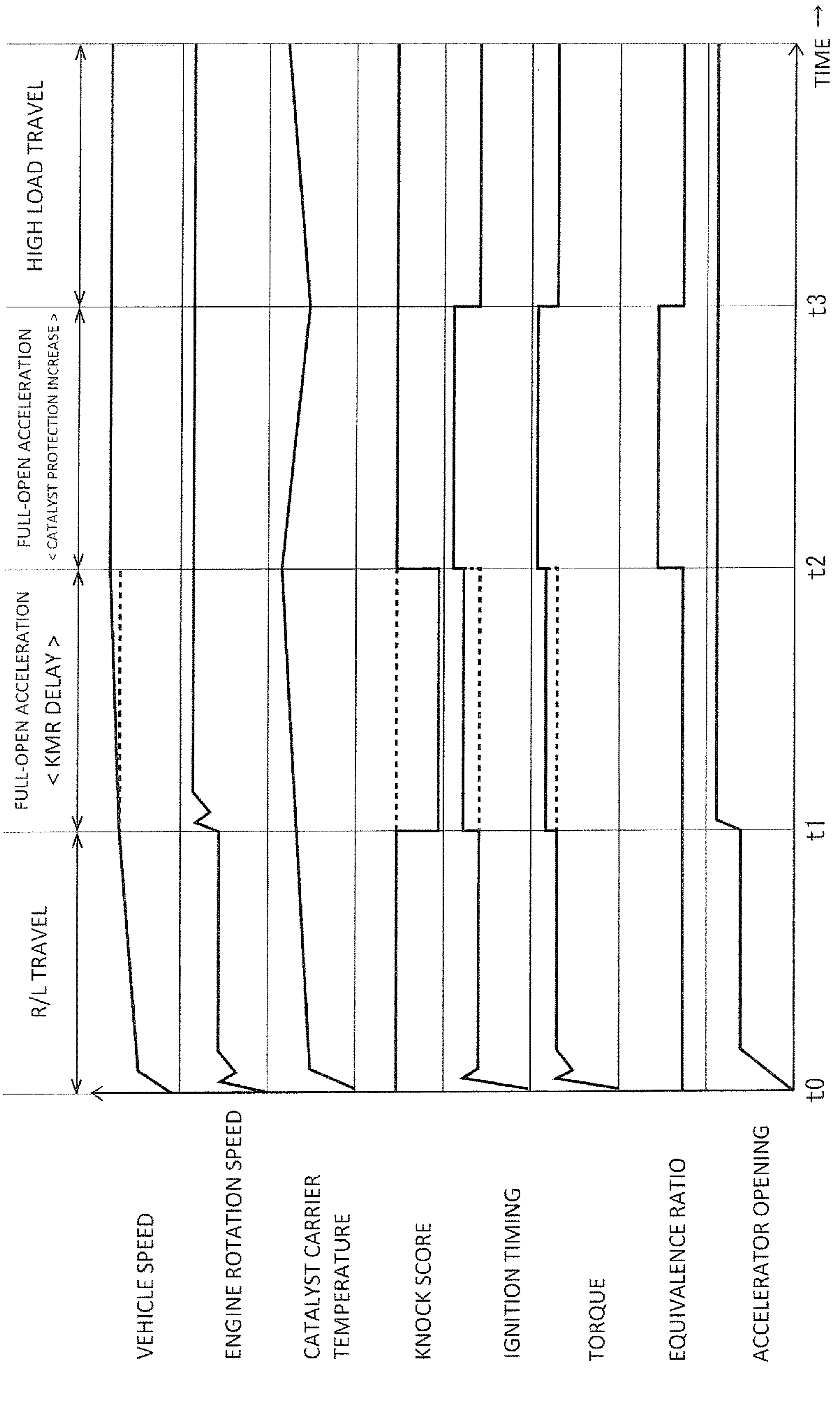
FIG. 3 shows time charts for explaining operation of the knocking control according the embodiment.

FIG. 3 shows time charts for explaining operation of the knocking control according to the embodiment. From the top of the drawing to the bottom, the following is shown in descending order: vehicle speed, engine rotation speed, catalyst carrier temperature, a knock score that is a functional value indicating good or bad of the knocking noise, ignition timing advance amount (an upper side in the drawing is an advance side), output torque of the internal combustion engine 1, an equivalence ratio indicating dilution of fuel, and an accelerator opening. It is noted that these time charts are simplified time charts for explanation, and do not illustrate precise or exact characteristics.

In the drawing of the time charts, a period from an initial point (to) to time t1 is a period of normal travel, i.e. so-called R/L (Road Load) travel. In this example, for the period up to time t1 too, knocking is in the trace-knock state (the first trace-knock state), and the knock score is kept at a relatively good and high value.

At time t1, the driver fully opens the accelerator opening (the driver fully depresses the accelerator pedal), and the vehicle travel shifts to the full-open acceleration. Then, for instance, based on increase in the catalyst temperature shown in FIG. 3, at time t2 that is delayed from change of the accelerator opening, the catalyst protection increase is started.

A period from time t1 to time t2 is the delay period up to start of the catalyst protection increasing control. The equivalence ratio shown in FIG. 3 is maintained at "1" that is equivalent to the theoretical air fuel ratio, similar to the period up to time t1. In this period (the delay period), although the ignition timing is retard-corrected due to the knocking control and knocking is brought into the trace-knock state (the second trace-knock state), as described above, by the change of the knock judgment threshold value and the retardation speed/advance speed, as compared with the first trace-knock state before the second trace-knock state, the ignition timing is relatively advanced. Because of this, the knock score indicating the knocking noise shown in FIG. 3 is deteriorated, i.e. lowered. However, since the ignition timing is relatively advanced and approaches the MBT point, torque of the internal combustion engine 1 shown in FIG. 3 becomes high, then as shown in FIG. 3, acceleration performance of the vehicle is enhanced. In the drawing, characteristics shown by broken lines in the period from time t1 to time t2 indicate characteristics of a comparative example in which the above change of the knock judgment threshold value and the retardation speed/advance speed based on the conditions of "the accelerator opening is the full-open-equivalent opening or more" and "a current time is in the delay period until the catalyst protection increasing control is started (the delay period up to start of the catalyst protection increasing control)" is not made.

At time t2, the catalyst protection increase is started, and as shown in FIG. 3, the equivalence ratio becomes high. Further, since the knock judgment threshold value and the retardation speed/advance speed are returned to a value and speeds for the normal ignition timing feedback control, knocking is brought into the first trace-knock state. However, since knocking is less prone to occur due to increase in fuel amount, i.e. due to the air fuel ratio becoming rich, as shown in FIG. 3, the ignition timing in the first trace-knock state is at a relatively advance side.

At and after time t3, because the catalyst temperature shown in FIG. 3 decreases, the catalyst protection increase is ended, and the operation becomes a normal high load operation. Since the catalyst protection increase is ended, the equivalence ratio shown in FIG. 3 becomes equivalent to the theoretical air fuel ratio, and the ignition timing in the first trace-knock state is changed (shifted) to a retardation side.

Although the invention has been described above by reference to the embodiment of the invention, the invention is not limited to the embodiment described above, and various modifications can be made. For instance, the above embodiment is described by taking the inline three-cylinder internal combustion engine for example. However, the present invention can be applied to an arbitrary multi-cylinder internal combustion engine or a port-injection internal combustion engine. Further, as the knocking detection sensor, a cylinder pressure sensor for detecting a cylinder pressure of each cylinder can be used. Furthermore, in the above embodiment, the operating region is broadly divided into the MBT control region and the trace control region. However, in the present invention, the control with the operating region being broadly divided into the MBT control region and the trace control region is not essential.

In addition, in the above embodiment, both of the change of the knock judgment threshold value and the change of the retardation speed/advance speed are made so that the ignition timing in the second trace-knock state is controlled to the relatively advance side as compared with that in the first trace-knock state. However, it is possible to perform the control by only either one of the both changes so that the ignition timing is controlled to the relatively advance side.

EXPLANATION OF REFERENCE

1 . . . internal combustion engine
3 . . . ignition plug
5 . . . knocking sensor
12 . . . engine controller
16 . . . accelerator opening sensor
21 . . . knocking judgment unit
25 . . . second threshold value table
31 . . . ignition timing correction unit
33 . . . trace feedback correction amount calculation unit
39 . . . retardation/advance speed table

What is claimed is:

1. A method of controlling knocking of an internal combustion engine, the method comprising:

when knocking containing a knocking vibration element that is equal to or greater than a knock judgment threshold value is detected, retarding an ignition timing at a predetermined retardation speed;

while the knocking is not detected, gradually advancing the ignition timing at a predetermined advance speed so as to approach a Maximum Brake Torque (MBT) point;

performing an ignition timing correction to target a first trace-knock state; and for a period from a time point when an accelerator opening is a full-open-equivalent opening or more to a time point when a predetermined catalyst protection control that increases a fuel injection amount to lower a catalyst temperature is started, performing an ignition timing correction to target a second trace-knock state in which the ignition timing is controlled to an advanced side as compared with that in the first trace-knock state.

2. The method of controlling the knocking of the internal combustion engine as claimed in claim 1, wherein for the period from the time point when the accelerator opening is the full-open-equivalent opening or more to the time point when the predetermined catalyst protection control is started, the knock judgment threshold value is set to be increased.

3. The method of controlling the knocking of the internal combustion engine as claimed in claim 1, wherein for the period from the time point when the accelerator opening is the full-open-equivalent opening or more to the time point when the predetermined catalyst protection control is started, the retardation speed is set to be decreased, and the advance speed is set to be increased.

4. The method of controlling the knocking of the internal combustion engine as claimed in claim 1, wherein for the period from the time point when the accelerator opening is the full-open-equivalent opening or more to the time point when the predetermined catalyst protection control is started, the knock judgment threshold value is set to be increased, the retardation speed is set to be decreased, and the advance speed is set to be increased.

5. The method of controlling the knocking of the internal combustion engine as claimed in claim 1, wherein the full-open-equivalent opening is previously set for each engine rotation speed.

6. The method of controlling the knocking of the internal combustion engine as claimed in claim 1, wherein the full-open-equivalent opening includes a first full-open-equivalent opening that is used for an opening increasing direction and a second full-open-equivalent opening that is a smaller opening used for an opening decreasing direction so that the full-open-equivalent opening has hysteresis.

7. A knocking control device of an internal combustion engine comprising:

a knocking detection sensor provided at the internal combustion engine;

a knocking judgment unit configured to perform knocking judgment by comparing a signal of the knocking detection sensor with a knock judgment threshold value; and an ignition timing correction unit configured to, when knocking containing a knocking vibration element that is equal to or greater than the knock judgment threshold value is detected by the knocking judgment unit, retard an ignition timing at a predetermined retardation speed, and while the knocking is not detected, gradually advance the ignition timing at a predetermined advance speed so as to approach a Maximum Brake Torque (MBT) point, wherein the ignition timing correction unit is configured to perform an ignition timing correction to target a first trace-knock state, and for a period from a time point when an accelerator opening is a full-open-equivalent opening or more to a time point when a predetermined catalyst protection control that increases a fuel injection amount to lower a catalyst temperature is started, to perform an ignition timing correction to target a second trace-knock state in which the ignition timing is controlled to an advanced side as compared with that in the first trace-knock state.

* * * * *